A. SHAW.
Wheel Cultivator.

No. 91,876.  Patented June 29, 1869.

Witnesses;

Inventor;
Alexander Shaw

United States Patent Office.

ALEXANDER SHAW, OF MONMOUTH, ILLINOIS.

Letters Patent No. 91,876, dated June 29, 1869.

IMPROVEMENT IN CULTIVATORS.

The Schedule referred to in these Letters Patent and making part of the same.

*To all whom it may concern:*

Be it known that I, ALEXANDER SHAW, of Monmouth, in the county of Warren, and State of Illinois, have invented a new and improved Cultivator; and I do hereby declare the following to be a full, clear, and exact description of the same, which will enable others skilled therein to make and use the machine, reference being had to the accompanying drawings, forming part of this specification.

This invention relates to a new and improved manner of frame for attaching double-shovel plows to, for the purpose of cultivating plants in rows; and The invention consists in the manner of constructing and combining the wrought and cast-iron parts so as to form a cheap, durable, simple, and effectual frame.

Figure 1:
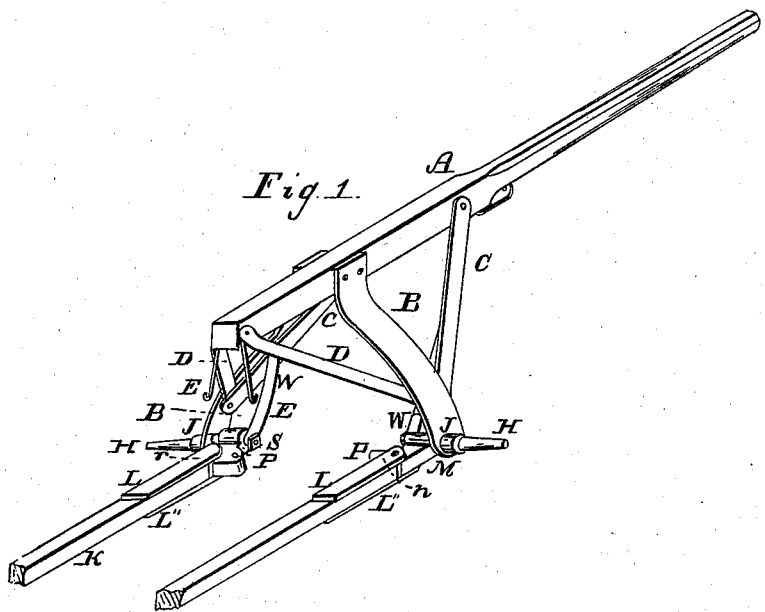

Figure 1, in the drawings, is a perspective view of the frame and the cultivator-beams attached.

Figure 2:
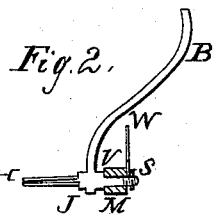

Figure 2 is a sectional view of one of the arms and spindle.

Similar letters of reference indicate corresponding parts.

Letter A, fig. 1, represents the draught-pole.

Letters B B represent the main frame-pieces, which are bolted to the tongue or draught-pole A, at their upper end, and have such curve given them as to throw them the desired distance apart at the lower end, and are made such length as to enable the tongue to pass over the growing plants.

Letter B, fig. 2, is a vertical sectional view of the main frame-piece, and

Letter H is the spindle, and V, the pivot for attaching the beams.

The frame-piece B, spindle H, and pivot V, are cast in one solid piece.

The spindle H is provided with shoulder J, to keep the wheel in the proper place.

Letter C, fig. 1, is a brace, riveted to the frame-piece B, near the lower end, and attached to the draught-pole forward.

Letter D is a brace, attached, also, to the frame-piece A, and to the rear end of the tongue.

Letter W is a brace, attached to the inner end of the pivot V, and, passing forward, is attached to the brace C.

Letter M is the joint for attaching the beams K to the pivot V.

The joint M is provided with holes P, for lateral adjustment of the plows to varying distances between the rows of plants.

Letters L, fig. 1, represent plates attached to the upper and lower side of beam K, and made to fit closely on the joint M, so that when the bolt r is in place, it may be made a solid joint, and prevent all shaking or twisting.

The joint M is pivoted loosely on the pivot V, to admit of vertical motion of the plows.

S, figs. 1 and 2, is a nut on the pivot V, for holding the joint M in place.

Letters E, fig. 1, represent hooks, extending down from the rear of the draught-pole A, for the purpose of hooking up the plows when desired.

Having thus described my invention,

What I claim as new, and desire to secure by Letters Patent, is—

1. The construction, arrangement, and combination of the frame-piece B, spindle H, pivot V, pivot-joint M, and brace W, as shown and for the purpose described.

2. In combination with the above devices, the braces C D, tongue A, plates L L, and plows K K, arranged as shown and for the purpose described.

ALEXANDER SHAW.

Witnesses:
W. B. RICHARDS,
J. M. MARTIN.